United States Patent

Naumann

[11] 4,077,884
[45] Mar. 7, 1978

[54] FUEL TANK ASSEMBLY

[75] Inventor: Fritz Albert Naumann, Stammham, Germany

[73] Assignee: Audi NSU Auto Union AG, Neckarsulm, Germany

[21] Appl. No.: 635,633

[22] Filed: Nov. 26, 1975

[30] Foreign Application Priority Data

Nov. 29, 1974 Germany .............................. 2456525

[51] Int. Cl.² .................... E03B 11/00; B65D 87/12
[52] U.S. Cl. .............................. 210/172; 123/DIG. 2; 210/455; 220/22
[58] Field of Search ........... 55/182; 123/136, DIG. 2; 137/574; 210/167, 172, 232, 455, 482; 220/22

[56] References Cited

U.S. PATENT DOCUMENTS

| 1,191,741 | 7/1916 | Scull | 210/172 |
| 1,578,903 | 3/1926 | McGowan | 210/482 X |
| 2,711,828 | 6/1955 | Webb et al. | 210/172 X |
| 2,770,362 | 11/1956 | Paquin | 210/172 X |
| 3,049,171 | 8/1962 | Neuerburg et al. | 137/574 X |
| 3,143,187 | 8/1964 | Stefan | 210/172 X |
| 3,173,469 | 3/1965 | Shockey | 137/574 X |
| 3,653,531 | 4/1972 | Zurmuehlen | 220/22 X |
| 3,881,457 | 5/1975 | Benner et al. | 123/136 |

Primary Examiner—Thomas G. Wyse
Assistant Examiner—Robert H. Spitzer
Attorney, Agent, or Firm—Karl F. Ross

[57] ABSTRACT

A fuel tank is provided in the middle of its floor with a vessel from which the fuel is withdrawn by a fuel pump. A plurality of upright baffles are spaced radially apart around the vessel and have edges turned toward the vessel and received in reinforcing ribs of a filter carried over the vessel and formed as a downwardly open cup. A fuel-recirculating pipe directs a stream of fuel backwardly in the direction of travel against the forward face of the filter cup.

4 Claims, 2 Drawing Figures

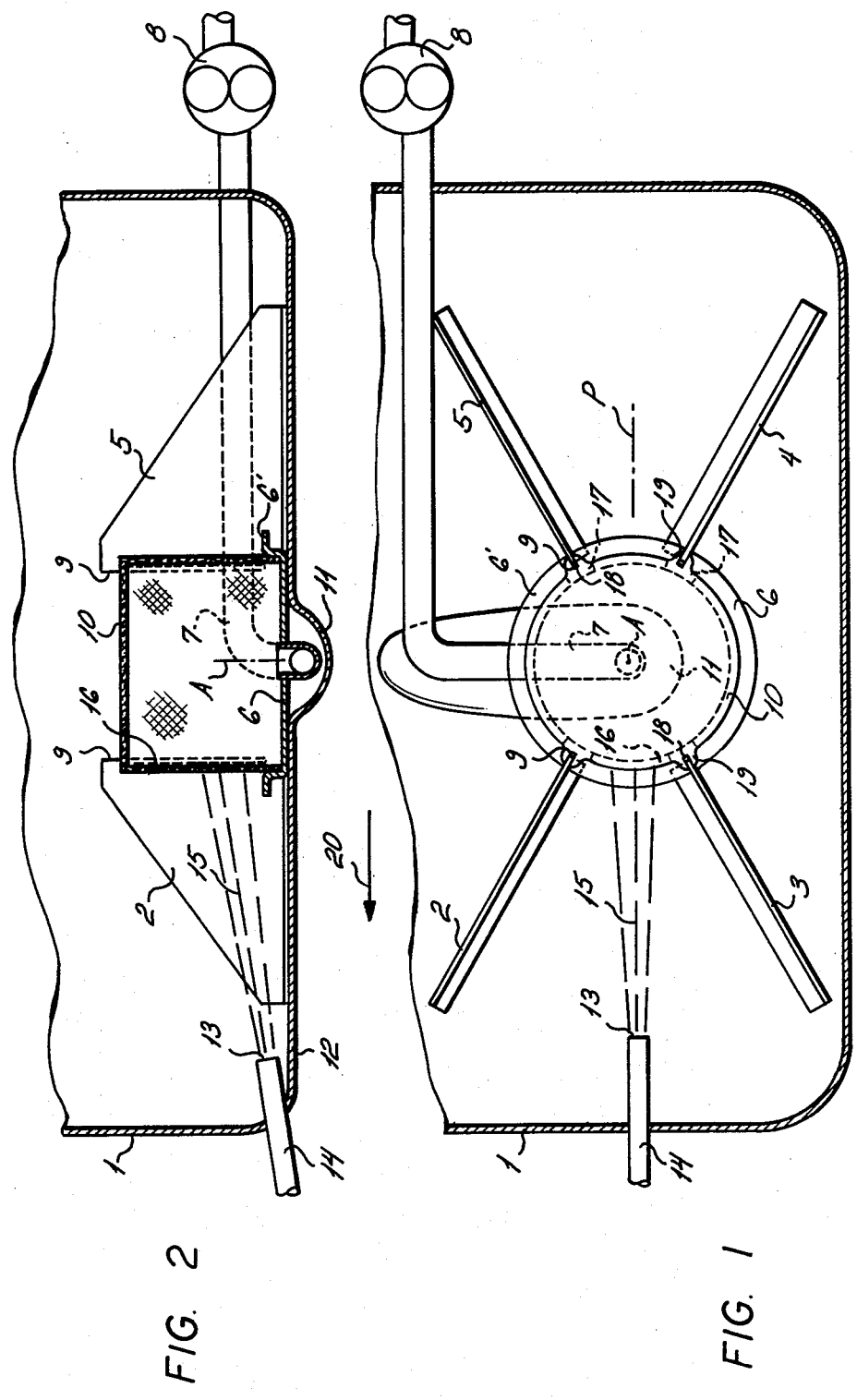

FUEL TANK ASSEMBLY

FIELD OF THE INVENTION

The present invention relates to a fuel tank. More particularly this invention concerns a vehicular fuel tank provided internally with antislosh baffles.

BACKGROUND OF THE INVENTION

A fuel-tank assembly for a motor vehicle usually is provided on its floor with a vessel from which the fuel is pumped to the engine. The fuel not consumed by the engine is recirculated by this pump back into the tank. This tank is provided internally with upright antislosh plates or baffles which prevent the fuel therein from moving excessively back and forth.

The disadvantage of this system is that the unused fuel that is reintroduced back into the tank is substantially warmer than the fuel already in the tank. If constantly recirculated, the fuel will very quickly rise to a high temperature decreasing the efficiency of the pump and increasing the possibility of a vapor blockage of further fuel feed.

OBJECTS OF THE INVENTION

It is therefore an object of the present invention to provide am improved fuel-tank assembly.

Another object is the provision of such an assembly which overcomes the above-given disadvantages of the recirculating fuel system.

SUMMARY OF THE INVENTION

These objects are attained according to the present invention in a fuel tank assembly wherein a filter is provided between a pair of upright baffles in the tank above the vessel from which the fuel is withdrawn during operation of the motor vehicle.

According to a further feature of this invention the filter is fibrous, either made of woven or felted material, so that the filter itself takes the place of a separate deflector or impingement cup provided between the outlet of the recirculating conduit and the inlet for the means which withdraws fuel from the vessel in the tank.

In accordance with the present invention the surface tension of the fuel causes it to soak into the filter. Fuel then can pass through this filter and into the suction hole. In accordance with this invention the baffle plates have edges received in respective grooves each formed between a respective pair or reinforcement ribs in the filter so as securely to hold the arrangement together and form a good seal between the filter and baffles. These gaps are provided with seals.

According to yet another feature of this invention the opening of the return conduit is between two of the baffles and, relative to the normal vehicle direction of travel, is arranged in front of the filter so that as the vehicle is climbing a hill or accelerating the fuel is automatically carried back to the filter.

BRIEF DESCRIPTION OF THE DRAWING

FIG. 1 is a vertical section through a fuel-tank assembly according to this invention, and FIG. 2 is a horizontal section through the assembly of FIG. 1.

SPECIFIC DESCRIPTION

The fuel-tank arrangement according to the present invention as shown in FIGS. 1 and 2 has a tank 1 formed with a horizontal bottom wall 12 and adapted to be carried in a motor vehicle moving in the direction indicated by arrow 20. This tank 1 is formed in the middle of its bottom wall 12 with a well 11 receiving an outlet conduit 7 that terminates in an upwardly open vessel 6 in the center of the tank.

The bottom wall 12 of the tank is also fitted with four similar upstanding baffle plates 2, 3, 4, and 5. These plates 2-5 have parallel edges 9 turned toward the vessel 6 and all extend radially of the vertical axis A passing through the mouth of the conduit 11 and the center of the vessel 6. The plates 2 and 4 are coplanar and the plates 3 and 5 are coplanar. In addition the plates 2 and 3 are symmetrical and extend at angles of 30° to a symmetry plane P including the axis A and parallel to the direction 20.

Received snugly within the vessel 6 is a filter 10 formed as an inverted cup with its open lower edge snugly received within the vessel 6. This cup is vertically cylindrically and is formed with reinforcing ribs 19 each formed by a pair of lips 17 themselves forming a gap or groove 18 receiving the edge 9 of one of the walls 2-5, so that this filter 10 is held snugly in place between the edges 9 and fluid flow between the edges 9 and the filter 10 is impossible.

The filter is formed of a nonsoluble synthetic-resin such as polyvinyl chloride in matted fiber form. The outlet 13 of the recirculating conduit 14 is slightly above the floor 12 and the conduit is aimed to direct the stream 15 back in the direction 20 against a front side 16 of the filter 10.

When the tank is full, fuel issuing from the conduit 14 merely mixes with the fuel in the tank so that its heat is largely dissipated. When, however, the fuel level in the tank is very low, indeed below the mouth 13 of the conduit 14 or the rim 6' of the vessel 6 so that there is even the possibility that the conduit 7 will suck in some air, the stream impinges directly against the front side 16. This fuel is therefore soaked into the filter 10 and cools by contact with the surroundings before draining directly down into the cup 6 and being sucked out. The stream 15 is directed back in the direction 20 of travel so that even during hill climbing or acceleration the recirculating fuel is fed back after cooling into the vessel 6.

I claim:

1. A fuel-tank assembly comprising:
   a fuel tank having a floor and sides and adapted to hold a quantity of liquid fuel;
   a recess in the floor of said tank, said recess being open upwardly;
   an inverted cup of fibrous material forming a filter and positioned over said recess, said cup having a cylindrical periphery;
   a first pipe lying in said recess and opening into said cup for withdrawing fuel from said tank through said filter;
   a plurality of upright baffles in said tank secured to said floor and terminating adjacent said cup, said baffles being angularly spaced around said cup;
   a further pipe opening into said tank and inclined upwardly while being trained on said periphery of said cup for directing a jet of recirculated heated fuel upwardly and radially against the exterior of said cup; and
   means for withdrawing fuel through said first pipe and recirculating heated fuel to said tank through said further pipe.

2. The assembly defined in claim 1 wherein said filter is formed with grooves, said baffles having edges fitted into said grooves.

3. The assembly defined in claim 1 forming part of a vehicle wherein said baffles are spaced apart transversely to a predetermined travel direction of said vehicle, said further pipe injecting fuel back opposite said direction in a stream against said filter.

4. The assembly defined in claim 3 wherein said baffles include a first and a second pair of such baffles bridged by and engaging said filter, the first pair being mainly forward of said filter and said second pair being mainly behind said filter in said direction.

* * * * *